Oct. 27, 1970     C. W. ALLEN     3,535,940
MECHANICAL-PNEUMATIC TRANSDUCER
Filed Sept. 28, 1967
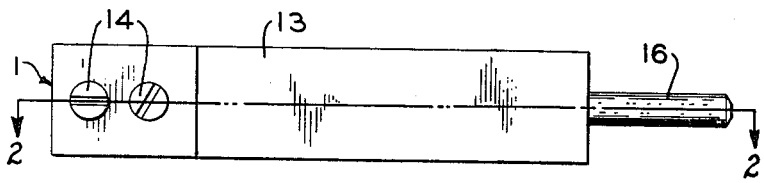
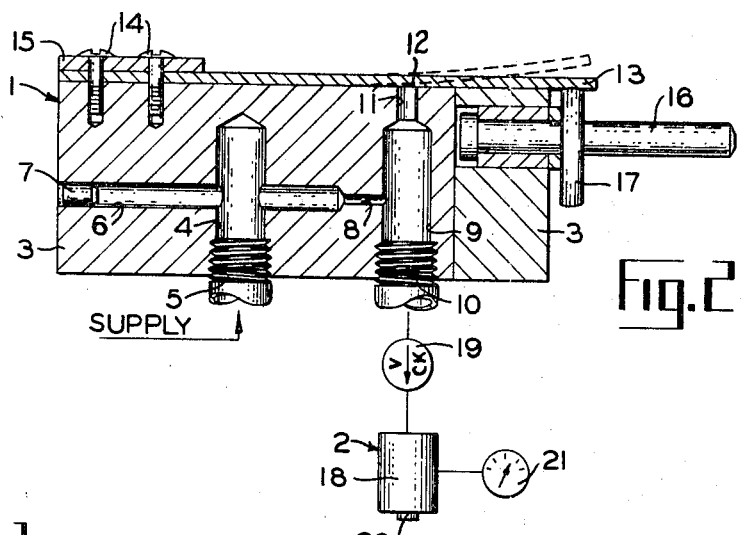
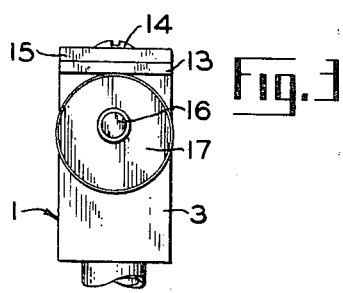
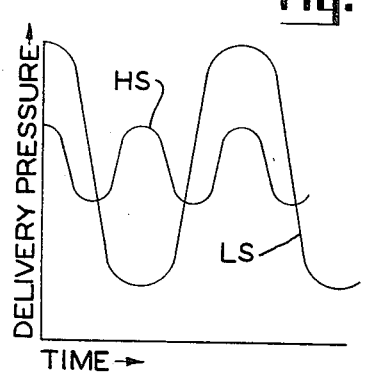
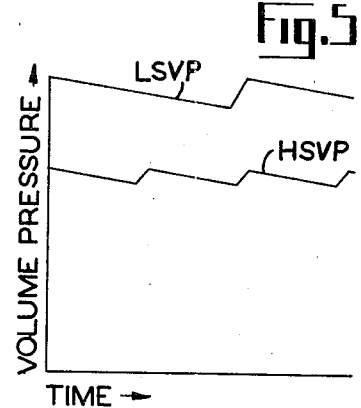
INVENTOR.
CLIFFORD W. ALLEN
BY Ralph W. McIntire Jr.
ATTORNEY

United States Patent Office 3,535,940
Patented Oct. 27, 1970

3,535,940
MECHANICAL-PNEUMATIC TRANSDUCER
Clifford W. Allen, Lexington, Ky., assignor to Westinghouse Air Brake Company, Wilmerding, Pa., a corporation of Pennsylvania
Filed Sept. 28, 1967, Ser. No. 671,479
Int. Cl. G01p 3/26
U.S. Cl. 73—506  5 Claims

ABSTRACT OF THE DISCLOSURE

An apparatus for converting the variable rotational speed of a shaft to a correspondingly variable fluid pressure by a cam on the shaft operating a flexible plate to open and close a bleed orifice communicated with the delivery port in a fluid pressure system so that with increased shaft speed the duration of each closure is proportionately decreased to correspondingly decrease the maximum delivery pressure attainable during each closure. The delivery port is communicated via a check valve with a vented integrating volume to provide a volume pressure averaging the amplitude of the delivery pressure fluctuation produced by the prevailing shaft speed.

---

Heretofore, mechanical-pneumatic transducers have been limited by their complicated structure and critical dimensions to use with low pressures supply systems, necessitating the use of gear trains on the input drive shaft to alter their useful speed ranges.

Accordingly, it the object of the present invention to provide a mechanical-pneumatic transducer device having small rotational inertia facilitating use with small, low-power equipment, simplified coupling between the mechanical and pneumatic devices, and which transducer is equally useful with either high or low pressure supplies.

In the present invention this object is achieved by disposing in a body a supply passage communicating with a delivery passage, and a bleed passage communicating the delivery passage with atmosphere at a bleed port on the top surface of the body. A spring member or plate is externally attached at one end to the top of the housing to normally complete overlie and close the bleed port, which plate is operable to be flexed to the raised position to open the bleed port when engaged on its underside by a cam fixed to a shaft disposed in the end of the body for rotation about its axis. The rotation of the shaft reciprocates the flexible plate to open and close the bleed port at a frequency which varies directly with the rotational speed of the shaft thereby varying the amplitude of the delivery pressure fluctuations inversely with the rotational speed of the shaft. The delivery passage is communicated via a check valve to a volume or reservoir which is vented to discharge very slowly relative to the high input of the check valve, thereby permitting rapid charging of the volume to substantially peak value of the prevailing delivery pressure fluctuations and at the same time permitting the volume to bleed down to register lower peak delivery pressures occurring at higher shaft speeds which pressures are averaged by the volume and read out on a Bourdon tube gauge.

The present invention may be usefully applied as a pneumatic tachometer, or as a speed feedback to a pneumatically controlled engine throttle to provide a pneumatic engine governor, or as a speed feedback on an air motor to provide speed control, or as an electro-pneumatic transducer translating voltage applied to an electric driving motor to fluid pressure.

The above and other objects of the invention will become more readily apparent in the following description, taken with the drawing in which:

FIG. 1 is a top plan view of apparatus which provides delivery pressure pulses having an amplitude inversely proportional to the speed of rotation on the input shaft;

FIG. 2 is a sectional view thereof, taken substantially along the line 2—2 of FIG. 1, and shown in combination with a fluid pulse integrator;

FIG. 3 is an end elevational view of the apparatus shown in FIG. 1;

FIG. 4 is a graphical illustration of the delivery pressure pulses for different speeds of shaft rotation; and FIG. 5 is a graphical illustration of the pressure in the pressure integrator as it relates to the graph of FIG. 4.

Referring now to the drawing, there is shown in FIGS. 1–3, taken collectively, a mechanical-pneumatic transducer generally comprising a fluid pressure operated device 1 for producing pressure fluctuations having an amplitude inversely proportional to the rotational speed of a mechanically or electrically driven input shaft, and a fluid pressure fluctuation integrating system 2 for averaging the amplitude of the pressure fluctuations so produced, to provide a pressure reading inversely proportional to the speed of rotation of the input shaft.

The pulse producing system 1 comprises a body 3 having a supply passage means communicating with a delivery passage means therein. In the particular embodiment shown, the supply passage means comprises a bottomed bore 4 having a supply port 5 opening at the bottom of the body, and disposed to perpendicularly intersect a bore 6 through the left end of the body, which bore 6 is closed at its mouth by a plug member 7 and communicates with the delivery passage via a necked portion 8. It is to be understood that the presently disclosed structure of the supply passage is not critical to the invention, and is shown as merely illustrative of a convenient means of construction. The delivery passage 9 opens at a delivery port 10 at the bottom of the body and communicates laterally with the end of the necked portion 8 of the supply passage means. A bleed passage 11 communicates the delivery passage with the top of the body at bleed port 12.

In order to provide a wide range in delivery pressure fluctuation resulting from the alternately opened and closed condition of the bleed port 12, the minimum diameter of the bleed passage is larger than the minimum diameter of the supply passage means, which relative size is illustrated in the drawings by showing the diameter of bleed passage 11 to be larger than the diameter of necked portion 8 of the supply passage means. Preferably, the cross-sectional area of the bleed passage is on the order of ten times larger than the cross-sectional area of the necked supply passage portion 8 for most efficient operation to provide a high bleed rate when the bleed passage is fully open.

In order to open and close the bleed port 12 in a continuously reciprocating mode to provide delivery pressure pulses with an amplitude varying inversely with the rotational speed of a device, one end of a flexible plate member 13 is fixed to the top of the body 3, as by screws 14 and washer 15, with the intermediate portion thereof overlying and normally closing bleed port 12, and with the free end thereof extending beyond the end of the body. A shaft member 16 is journalled in the right end of the body for rotation about its axis and carries thereon a transversely extending cam member 17 operable to engage and flex the plate upwardly to open the bleed port 12 during one time interval for each complete rotation of the shaft.

The fluid pressure pulse integrator 2 comprises a volume or reservoir 18 communicated with the delivery passage 9 via a check valve 19 which provides for charging the volume to nearly peak value of the maximum delivery pressure fluctuations. The volume is provided with a suitable vent 20 of such selected size as to provide for slow discharge of the volume relative to the charging rate through the check valve 19. Alternatively, if desired, the vent 20 may be disposed in parallel with the check valve 19 to bleed down volume 18 through the bleed passage 11 each time plate 13 is raised. A conventional Bourdon type gauge 21 is provided to read out the pressure within the volume 18.

In now describing the operation of the pulse producer 1, it will be assumed that a device, not shown, such as an electric motor or a reciprocating engine or other power source, is connected to rotate shaft 16. It will also be assumed that a fluid pressure source, not shown, is supplying fluid under predetermined constant pressure to supply input port 5.

Since the fluid under pressure in delivery passage 9 escapes through the bleed port 12 to atmosphere only by passing between the lower face of the plate 13 and the top surface of body 3, it will be seen that the effective size of bleed port 12 increases quite rapidly as the plate 13 is raised, that is, the effective size of the bleed orifice 12 varies as the product of the area of the bleed port 12 and the height the lower face of plate 13 is raised above the top surface of the body 3. Therefore, only slight flexing and return of the plate 13 will provide a wide range of pressure variation in the delivery passage for each opening and closing of bleed port 12. Further, since the maximum cross-sectional area of bleed passage 11 is several times larger than the minimum size of supply passage 8, so that opening the bleed port 12 reduces delivery pressure substantially to zero, the range in pressure fluctuation for each opening and closing of bleed port 12 is even further increased.

If it is now assumed that the shaft 16 is rotating at the lowest speed to be measured, it will be seen that each closure of the bleed passage 11 on each revolution of the shaft will occur for a time interval of fixed length, during which interval pressure in the delivery passage will gradually increase, in this instance to a value substantially equal to supply pressure, until the cam 17 flexes plate 13 to reopen bleed passage 11 thereby bleeding down the delivery pressure. It is seen that as the shaft rotates at a given speed, the plate 13 is reciprocated at a certain frequency to provide a fluctuating delivery pressure having a certain maximum amplitude for that speed, as illustrated by low speed delivery pressure line LS in FIG. 4 of the drawing.

Only the positive acting delivery pressure fluctuations so produced are fed to the volume 18 because of the unidirectional action of check valve 19, so that the volume charges quickly to a maximum value substantially at peak delivery, with slow bleed down occurring between pulses, as illustrated by low speed volume pressure line LSVP in FIG. 5 of the drawing, the rate of bleed down being controlled by the size of vent 20.

Assuming now that the speed of the shaft is increased to another value, it will be readily observed that the frequency of reciprocation of plate 13 proportionately increases so that the time duration for each closure of the bleed passage will be proportionately shorter, causing the bleed passage to be reopened to bleed down delivery pressure before the pressure in delivery passage has sufficient time to gradually build to the amplitude previously achieved at the lower shaft speed, as discussed above. Therefore, it is seen that as the speed of the shaft increases, the amplitude of the delivery pressure fluctuations is proportionately smaller, as illustrated by the high speed delivery pressure line HS in FIG. 4 of the drawing.

Since the peak value of the delivery pressure fluctuations is now less than that achieved at the hereinbefore discussed lowest shaft speed, the peak pressure now being fed to the check valve 19 is less than the previously established pressure within the volume 18, so that the check valve does not open until the volume 18 bleeds down via vent 20 to a value where the pressure within volume 18 is equal to or slightly less than the newly established smaller peak pressure now prevailing for the higher shaft speed, whereupon the newly established peak delivery pressure is fed via check valve 19 to volume 20 providing a new average pressure reading on its gauge 21, which new pressure is proportionately less than the previously established average pressure reading, as illustrated by high speed volume pressure line HSVP in FIG. 5 of the drawing.

The scale of the gauge 21 may be calibrated inversely relative to speeds for providing a direct reading of shaft speed.

From the foregoing description of the operation of the present device, it will be readily apparent that as the rotational speed of shaft 16 decreases, the frequency of reciprocation of plate 13 proportionately decreases thus proportionately increasing the time interval for each closure period of bleed port 12, thereby effecting a corresponding increase in the amplitude of the delivery pressure fluctuation which in turn charges the volume to a proportionately higher pressure.

In laboratory tests of the hereinbefore described device, it was observed that the relationship between shaft speed and the pressure in the integrating volume was fairly linear from 600 to 1500 r.p.m. It was also observed that the performance of the device is unaffected by the amount of lift of plate 13 relative to body 3, or the shape of cam 17, or the clearance between the cam 17 and the plate 13. It was further observed that the sensitivity of the volume 18 to shaft speeds increases with increase in supply pressure, and decreases with increase in the size of the vent 20.

Having now described the invention, what I claim as new and desire to secure by Letters Patent is:

1. A mechanical-pneumatic transducer device, comprising:
   (a) a body having therein a supply passage means intersecting a delivery passage means, and a bleed passage communicating said delivery passage to atmosphere at a bleed port opening at the exterior of said body;
   (b) means movable between a first position engaging said body to close said bleed port and a second position displaced from said body to open said bleed port,
      said movable means comprising a flexible plate member having a portion attached to said exterior of said body and flexibly movable to said second position, a second portion normally engaging the exterior of said body completely overlying said bleed port, and a third portion extending beyond the end of said body; and
   (c) mechanical means operable to repeatedly reciprocate said movable means from one of said first and second positions to the other and return at a frequency which varies directly with the speed of said mechanical means,
      said mechanical means comprising a shaft mounted in said end of said body for rotation about its axis, and a cam means disposed on said shaft engageable with said third portion of said flexible plate to reciprocably flex said plate member to alternately open and close said bleed port.

2. A mechanical-pneumatic transducer, comprising:
   (a) a body having therein a supply passage means communicating with delivery passage means, and bleed passage means communicating said delivery passage means to the exterior of said body at a bleed port;
   (b) a flexible plate member having one portion thereof attached to said exterior of said body, a second portion thereof normally in a first position engaging said exterior and completely overlying said bleed port, and a third portion;

(c) means engageable with said third portion of said plate member for repeatedly reciprocating said second portion of said plate from said first position to a raised position relative to said exterior of said body and return at a frequency directly proportional to the speed of said means engageable with said third portion;

(d) a vented volume; and (e) check valve means communicating said delivery passage with said volume.

3. A mechanical-pneumatic transducer, as recited in claim 2, in which a meter is provided to read out the pressure in said volume.

4. A mechanical-pneumatic transducer, comprising:

(a) a body having therein a supply passage means intersecting a delivery passage means, and a bleed passage communicating said delivery passage to atmosphere at a bleed port opening at the exterior of said body;

(b) means movable between a first position engaging said body to close said bleed port and a second position displaced from said body to open said bleed port;

(c) mechanical means operable to repeatedly reciprocate said movable means from one of said first and second positions to the other and return at a frequency which varies directly with the speed of said mechanical means to produce pressure fluctuations in said delivery passage; and (d) means comprising a vented volume and check valve means communicating said delivery passage thereto responsive to said pressure fluctuations in said delivery passage to provide a pressure corresponding to the average of said pressure fluctuations.

5. A mechanical-pneumatic transducer, as recited in claim 4, in which, the minimum internal diameter of said bleed passage is larger than the minimum internal diameter of said supply passage.

References Cited

UNITED STATES PATENTS

| 2,879,467 | 3/1959 | Stern | 73—506 XR |
| 3,099,995 | 8/1963 | Ranfenbarth | 137—82 |
| 3,392,739 | 7/1968 | Taplin et al. | 137—82 XR |
| 1,624,093 | 4/1927 | Davis | 73—506 XR |
| 3,005,349 | 10/1961 | Everett | 73—506 XR |

FOREIGN PATENTS

| 81,293 | 12/1894 | Germany. |
| 1,104,233 | 4/1961 | Germany. |
| 179,681 | 6/1962 | Sweden. |

JAMES J. GILL, Primary Examiner

U.S. Cl. X.R.

73—521; 137—56